United States Patent
Conrod et al.

(10) Patent No.: US 9,003,381 B2
(45) Date of Patent: Apr. 7, 2015

(54) CONTEXT-SPECIFIC OPTIMIZED CODE

(76) Inventors: Derek J. Conrod, San Diego, CA (US);
Subrato K. De, San Diego, CA (US);
Dineel D. Sule, San Diego, CA (US)

( * ) Notice: Subject to any disclaimer, the term of this patent is extended or adjusted under 35 U.S.C. 154(b) by 350 days.

(21) Appl. No.: 13/585,734

(22) Filed: Aug. 14, 2012

(65) Prior Publication Data

US 2014/0053143 A1 Feb. 20, 2014

(51) Int. Cl.
*G06F 9/45* (2006.01)
*G06F 9/455* (2006.01)

(52) U.S. Cl.
CPC ............. *G06F 8/443* (2013.01); *G06F 9/4552* (2013.01)

(58) Field of Classification Search
USPC .......................................................... 717/148
See application file for complete search history.

(56) References Cited

U.S. PATENT DOCUMENTS

| | | | |
|---|---|---|---|
| 7,284,199 B2 * | 10/2007 | Parasnis et al. ................ | 715/201 |
| 8,370,850 B2 * | 2/2013 | Nochimowski et al. ....... | 719/313 |
| 8,543,907 B1 * | 9/2013 | Roskind ......................... | 715/234 |
| 8,769,397 B2 * | 7/2014 | Tsun et al. ..................... | 715/234 |
| 2001/0044809 A1 * | 11/2001 | Parasnis et al. ................ | 707/513 |
| 2004/0082345 A1 * | 4/2004 | Lueckhoff ................. | 455/456.3 |
| 2009/0172694 A1 * | 7/2009 | Nochimowski et al. ....... | 719/313 |
| 2009/0327858 A1 * | 12/2009 | Tsun et al. ..................... | 715/234 |
| 2014/0053143 A1 * | 2/2014 | Conrod et al. ................ | 717/148 |

OTHER PUBLICATIONS

Bruening, et al., "Maintaining Consistency and Bounding Capacity of Software Code Caches," Int'l Symp. on Code Generation and Optimization, 2005. CGO 2005, Mar. 20-23, 2005, pp. 1-12.
Bruening, et al., "Process-Shared and Persistent Code Caches," VEE'08, Mar. 5-7, 2008, Seattle, Washington, pp. 1-10.
Cheng, et al., "A JIT Compiler for Android's Dalvik VM," May 2010, Slide(s) 32, Publisher: Google.
Elmalki, Z., "CLR Injection: Runtime Method Replacer", CodeProject, Jun. 23, 2009, p. 11 Publisher: Webpage found at http://www.codeproject.com/Articles/37549/CLR-Injection-Runtime-Method-Replacer downloaded Nov. 27, 2012, Published in: US.
Gentilcore, T., "Chrome's 10 Caches", Fastersite—On web performance, Feb. 5, 2011, p. 4 Publisher: Webpage found at http://gent.ilcore.com/2011_02_01 archive.html downloaded Nov. 27, 2012, Published in: US.

(Continued)

Primary Examiner — Don Wong
Assistant Examiner — Marina Lee
(74) Attorney, Agent, or Firm — Neugeboren O'Dowd PC

(57) ABSTRACT

A computing device comprising a JIT compiler, an application, and a JavaScript Engine. The computing device is adapted to receive at least one identified portion of a JavaScript source code, replace original context specific reference values in the JavaScript with one or more placeholders, and generate a first JIT copy of the code. The computing device is adapted to create a description of the original context specific reference values having one or more requirements, store the description, access runtime information related to the original context specific reference values, compare the runtime information to the stored description, obtain new context-specific reference values, replace/update the placeholders with the new context-specific reference values, generate a second JIT copy of the at least one identified portion of the JavaScript source code comprising the new context-specific reference values, and execute the second JIT copy in the new execution context.

22 Claims, 4 Drawing Sheets

(56) References Cited

OTHER PUBLICATIONS

"Code Caching with BEA JRockit", Oracle BEA User Guide, p. 5 Publisher: Webpage found at http://docs.oracle.com/cd/E13188_01/jrockit/docs142/userguide/codecach.html downloaded Nov. 27, 2012, Published in: US.

"JIT Compiler: Configuration and Statistics", p. 2, Publisher: Webpage found at http://help.sap.com/saphelp_nwpi711/helpdata/en/6f/240d5323bb498c937f67fc1e62a148/content downloaded Nov. 27, 2012, Published in: US.

"Do browsers parse javascript on every p. load?", Stackoverflow, p. 6 Publisher: Webpage found at http://stackoverflow.com/questions/1096907/do-browsers-parse-javascript-on-every-page-load downloaded Nov. 27, 2012, Published in: US.

"Where is the .NET JIT-compiled code cached?", Stackoverflow, p. 5 Publisher: Webpage found at http://stackoverflow.com/questions/3295622/where-is-the-net-jit-compiled-code-cached downloaded Nov. 27, 2012, Published in: US.

Sun, et al., "Efficient Code Caching to Improve Performance and Energy Consumption for Java Applications", Cases '08, Oct. 19 -24, 2008, p. 119-125, Publisher: ACM, Published in: Atlanta, GA.

* cited by examiner

CONTEXT-SPECIFIC OPTIMIZED CODE

BACKGROUND OF THE INVENTION

1. Field of the Invention

This invention is related to optimizing code such as, but not limited to, scripting language code. Specifically, but not intended to limit the invention, embodiments of the invention are related to creating optimized code across various virtual machines/runtimes for numerous programming languages which is reusable in browsers or other applications for multiple browsing contexts using a copy-and-update process, creating a new execution context for subsequent runs.

2. Relevant Background

When an application (e.g., a browser) accesses a new browsing context, one or more JavaScript® virtual machines ("VMs"), which are VMs for executing code written in JavaScript® scripting language, may execute segments of JavaScript® scripting language code (which may be referred to herein simply as "a script" or "a JavaScript®") contained within the browsing context by, for example, initially accessing and executing unoptimized just-in-time compiled ("JITed") code. A browsing context is an environment which contains information accessible to a JavaScript® such as, but not limited to a web page DOM (document object model) tree. Each web page comprises a particular browser context. Such an operation may be referred to as a slow start-up or a start-up. The JavaScript® VMs may then collect profiling data and optimize the JavaScript® execution using browsing context specific information. Highly optimized JavaScript® ASM (assembly language) code may then be created for each browsing context. Initially executing unoptimized JITed code may cause some JavaScripts® to execute slowly and this slow start-up may prevent an opportunity to use highly optimized JITed code, thereby limiting efficiency.

Furthermore, re-using highly optimized JITed code among browsing contexts is not possible with current architectures unless performance is compromised. For example, efficient optimized code makes assumptions which are checked at runtime in order for the JITed code to perform accurately and effectively. The fastest way to implement these checks is using context-specific data, that is, data from the browsing context which the JavaScript® is a part of. However, code containing context-specific checks cannot be correctly or safely executed in other browsing contexts as doing so may result in memory leaks and unauthorized access to private and context-specific data.

SUMMARY OF THE INVENTION

In order to diminish the slow execution of unoptimized JITed code during start-up, and to implement the re-use of optimized JITed code in different browser contexts, a system, device, and method were created to improve JavaScript® performance. Performance improvement is possible by creating context-specific optimized JITed code for new browser contexts without going through the slow start process.

One embodiment of such an invention comprises a computing device comprising a JIT compiler, an application, and a JavaScript® Engine. The JIT compiler is adapted to receive at least one identified portion of a JavaScript® source code where each original context-specific reference value in the JavaScript® have been replaced with a placeholder value. The JIT compiler then generates a first JIT copy of the at least one identified portion of the JavaScript® source code. The first JIT copy of the at least one identified portion of the JavaScript® source code at least partially comprises the placeholder values. The application is adapted to store the first JIT copy of the at least one identified portion of the JavaScript® source code, create a description of the original context-specific reference values, the description comprising one or more requirements, and also store the description. The application may then access the current runtime information corresponding to the placeholder values and compare the runtime information to verify that the assumptions are satisfied. Furthermore, new context-specific reference values may be obtained when the one or more requirements are satisfied. The new context-specific reference values may replace the placeholders in the first JIT copy and the JIT compiler may generate a second JIT copy comprising the new context specific reference values, with the JavaScript® Engine being adapted to execute the second JIT copy of the at least one identified portion of the JavaScript® source code.

Another embodiment of the invention comprises a computing system. One computing system comprises means for replacing one or more context-specific references in at least a portion of a JavaScript® with one or more dummy variables, means for compiling the at least a portion of a JavaScript®, and means for executing the at least a portion of a JavaScript® across a plurality of browsing contexts.

And another embodiment of the invention comprises a method of executing a JavaScript®. The method comprises selecting a portion of the JavaScript® to optimize and generating a first JIT copy of the portion of the JavaScript®. In one embodiment, the first JIT copy comprises browsing context information. The method further comprises creating one or more assumptions associated with the browsing context information, replacing the browsing context information with one or more placeholders, storing the first JIT copy and the one or more assumptions, and creating a second JIT copy of the portion of the JavaScript®, where the second JIT copy comprises the one or more placeholders. Further method steps may include obtaining a runtime value for each of the one or more placeholders, comparing the runtime value to the one or more assumptions, determining if the runtime value satisfies the one or more assumptions, and replacing the placeholders with the new browsing context information when the runtime value satisfies the one or more assumptions. Finally, the method may include executing the second JIT copy of the portion of the JavaScript® with the new browsing context information when the runtime value satisfies the one or more assumptions.

Yet another embodiment of the invention comprises a non-transitory, tangible computer readable storage medium, encoded with processor readable instructions to perform a method of processing at least a portion of a JavaScript®, with the JavaScript® comprising one or more first context specific references. One such method comprises creating a data file having at least one attribute related to each of the one or more first context specific references. The at least one attribute may comprise at least one requirement. The method may further store the data file and replace each of the one or more first context specific references in the at least a portion of a JavaScript® with a dummy variable. The method may further compile the at least a portion of the JavaScript® with the dummy variables to create a compiled JavaScript®, store the compiled JavaScript®, and execute the compiled JavaScript® in a first browser context. The compiled JavaScript® may be executed in the first browser context by accessing the data file, obtaining a runtime value associated with each of the at least one attribute, comparing each runtime value to the at least one attribute, determining if each runtime value satisfies the at least one requirement, obtaining one or more second context specific references for each runtime value that satisfies the at least one requirement, replacing each dummy variable in the JavaScript® with the one or more second context specific references, and executing the compiled JavaScript® with the one or more second context specific references.

Illustrative embodiments of the present invention that are shown in the drawings are summarized below. These and other embodiments are more fully described below in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

BRIEF DESCRIPTION ON THE DRAWINGS

DETAILED DESCRIPTION

Figure 1:
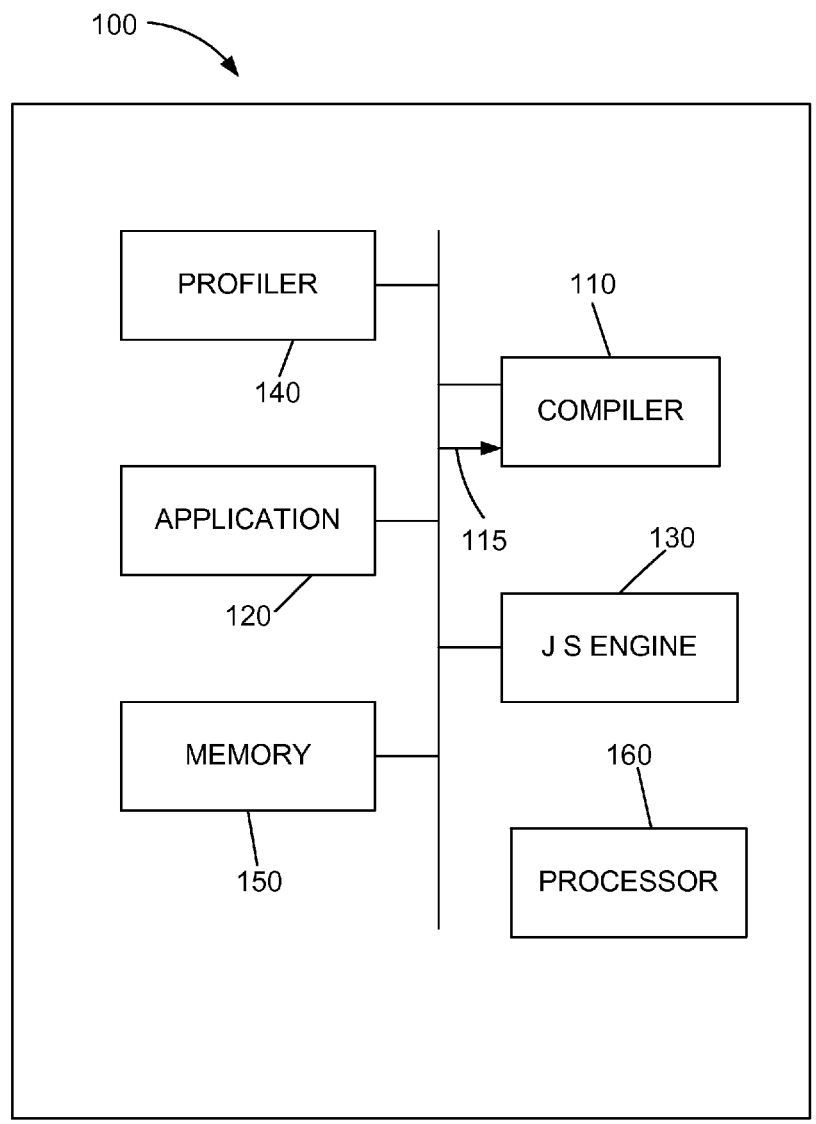
FIG. 1 illustrates a block diagram depicting components of a computing device.

Referring first to FIG. 1, seen is a computing device 100 comprising a JIT compiler 110, application 120, and JavaScript® Engine 130. It is contemplated that although each of the JIT compiler 110, application (e.g., browser) 120, and JavaScript® Engine 130 are described below as performing one or more functions or operations, any other of the JIT compiler 110, application (e.g., browser) 120, and JavaScript® Engine 130 may perform one or more of the same functions or operations. Furthermore, although the one or more functions or operations described below may be discussed in a particular order, it is contemplated that the order of the one or more specified functions or operations described below may occur in a different order. Additionally, one or more portions of the JIT compiler 110, application 120, and JavaScript® Engine 130, or any other portion of the computing device 100 may comprise a portion of any other of the JIT compiler 110, application 120, and JavaScript® Engine 130 or any other portion of the computing device 100.

In one embodiment, the JIT compiler is adapted to receive 115 at least one identified portion of a JavaScript® source code (the JIT compiler 110 may also be referred to as a compiler 110). For example, a runtime profiler 140 may identify at least a portion of a particular JavaScript® source code, such as, but not limited to, a function in the JavaScript®, to optimize. The runtime profiler 140 may identify JavaScript® source code to optimize through, for example, the runtime profiler 140 comprising a counter determining the number of times a JavaScript® function is called upon accessing a browsing context. If a predetermined counter threshold is reached for the number of times the JavaScript® function is called, the JavaScript® function may be compiled by the JIT compiler 110. Alternative methods known in the art to identify functions or other JavaScript® portions to optimize are also contemplated.

In one embodiment, the at least one identified portion of the JavaScript® may comprise one or more original context specific reference values. One context specific reference value may comprise a reference to at least a portion of an object in the browsing context. For example, one context specific reference value may comprise a number, a string, or a map of an object. Objects themselves may also comprise a context specific reference value. Upon receiving 115 the at least one identified portion of a JavaScript®, the compiler 110 may replace each of the original context specific reference values in the at least one identified portion of a JavaScript® with one or more placeholders. For example, a dummy variable adapted to take up space in the at least one identified portion of a JavaScript® may replace the original context specific reference values.

Upon replacing the context specific reference values with the placeholders, the JIT compiler 110 may be adapted to generate a first JIT copy of the at least one identified portion of the JavaScript® source code. The first JIT copy of the at least one identified portion of the JavaScript® source code may comprise the one or more placeholders. Furthermore, the first JIT copy may be referred to as a JITed copy. In one embodiment, the application 120 may be adapted to store the first JIT copy of the at least one identified portion of the JavaScript® source code. For example, the first JIT copy may be stored in a device memory 150. By not comprising any context-specific references, the first JIT copy may be used across browsing contexts. In one embodiment, the application may comprise a browser and may use an embedded JavaScript® Engine (Virtual Machine/VM) to store the first JIT copy of the at least one identified portion of the JavaScript® source code. Furthermore, it is contemplated that although references herein pertain to JavaScripts®, such references may be replaced by any other coding language known in the art providing similar features.

In order to use the first JIT copy across browsing contexts, the application 120 may create a description of the original context specific reference values found in the at least one identified portion of the JavaScript®. For example, in one embodiment, the application 120 may comprise a web browser and the original context specific reference values may comprise at least a portion of one or more objects in a first browsing context comprising a web page accessed by the application 120. The description of the original context specific reference value created by the application 120 may comprise one or more assumptions of the original context specific reference values in the at least one identified portion of the JavaScript®. For example, one or more assumptions may assume that each time the JavaScript® is run across various browsing contexts, the structure of an object comprising a context specific reference value in each browsing context is the same. The description may therefore further comprise obtaining a specific portion of the object. It is contemplated the description may further comprise one or more additional requirements. This description may be accessed by the application (e.g., browser) 120 when the JavaScript® is initiated in a new browsing context.

Upon creating the description of each original context specific reference value, the application 120 may store the description of the original context specific reference values in the memory 150 for later access. For example, the description of the original context specific reference values may be stored in a table format. In one embodiment, if the at least a portion of the JavaScript® being optimized may comprise a function and the original context specific reference values may comprise one or more function variables. In such an embodiment, the stored table may associate each of the original context specific reference values to the particular function variable and may store the function. Multiple optimized functions may be referenced in a single table.

In one embodiment, upon storing the first JIT copy and the descriptions of the original context specific reference values comprising one or more assumptions in a data file such as, but not limited to, a table, the application 120 may access runtime information related to the original context specific reference values. For example, the application 120 may comprise a browser having an embedded JavaScript® Engine/VM which may access a new browsing context comprising runtime values related to the original context specific reference values, but having different values than the original context specific reference values for the original browsing context. Upon accessing the runtime information, the application 120 may compare the runtime information to the stored description of the original context specific reference values in the data file and determine if the one or more assumptions and/or requirements listed in the description are satisfied by the runtime values. If the assumptions/requirements are satisfied, the application 120 may obtain new context-specific reference values from the runtime information.

One example of obtaining new context-specific reference values may entail when the JavaScript® requires a specific value or property from an object. The description in the data file may provide a detail about the object which is accessible from the runtime information, such as, but not limited to, a value located in the object at a specified location. If this runtime value at the specified object location equals the assumption, the application may then obtain and replace the one or more placeholders in the first JIT copy of the at least one identified portion of the JavaScript® with one or more new context-specific reference values. In one embodiment, the new context-specific reference value may comprise the runtime information. Alternatively, the new context-specific reference value may be obtained from the runtime value. For example, if one or more runtime values are satisfied, the application 120 may place a known object map as the context-specific references value.

Upon replacing the placeholders with the new context-specific reference values, based on runtime values from the second browsing context, the application 120 may employ the JIT compiler 110 to generate a second JIT copy of the at least one identified portion of the JavaScript® source code. It is contemplated that in one embodiment the runtime information comprises a number value. Additionally, at least one of the one or more objects may comprise a document object model ("DOM") tree.

Instead of comprising the placeholders like the first JIT copy, in one embodiment, the second JIT copy of the at least one identified portion of the JavaScript® source code comprises the new context-specific reference values. Finally, the JavaScript® Engine 130 may be adapted to execute the second JIT copy of the at least one identified portion of the JavaScript® source code in the second browsing contexts. In one embodiment the second JIT copy may be executed in a browsing context where one or more objects comprising the browsing context adapted for use in a user interface media display. Executing the second JIT copy in the new execution context improves performance as the virtual machine is able to bypasses the slow start execution mechanism in the new context for similar JavaScript® code by jump-starting execution with highly optimized context specific JITed code through the copy and replace/update mechanism.

Figure 2:
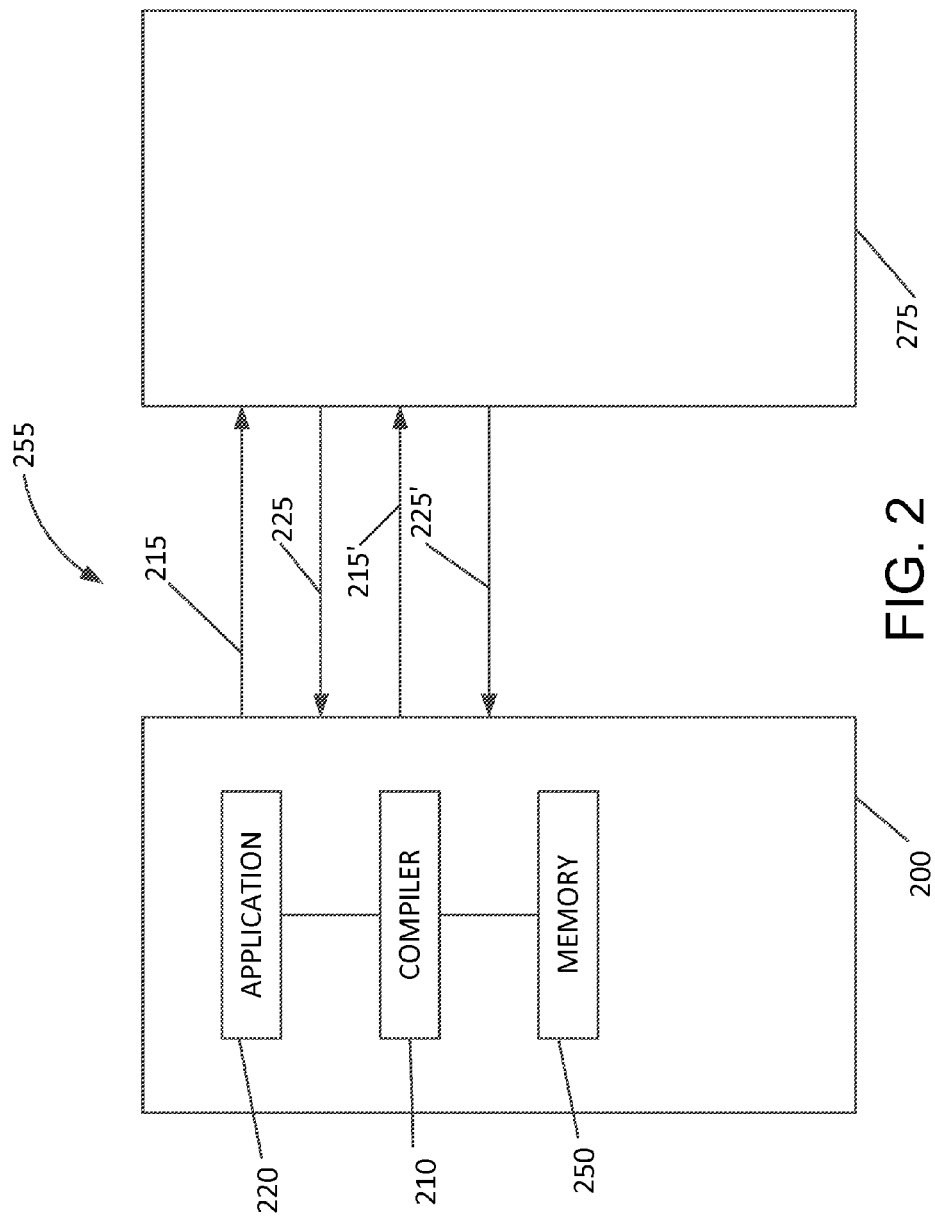
FIG. 2 illustrates a block diagram of a computing system illustrating communication between a computing device and a network device.

One embodiment of the invention may be referred to as a computing system. For example, one computing system may comprise at least a portion of the computing device 100 seen in FIG. 1. Such a computing system may comprise a means for replacing one or more context-specific references in the at least a portion of a JavaScript® with one or more dummy variables. For example, the received context-specific references discussed above may be replaced. Various examples replacing context-specific reference values with dummy variables are disclosed throughout the specification. In one embodiment, a computing system 255, as shown in FIG. 2, may comprise a computing device 200 such as, but not limited to, a mobile computing device. The computing device 200 may request 215 to receive a JavaScript® from a network device 275. For example, a user may direct a computing device application 220 such as, but not limited to, a web browser, to access a web page. The web page may comprise one or more JavaScripts® stored on the network device 275 or another network device 275. The network device 275 may receive the request 215 and issue a response 225, providing the application 220 with the JavaScript®.

Upon receiving the JavaScript® from the network device 275 in the response 225, the application 220 may employ the use of a compiler 210 to compile at least a portion of a JavaScript®. In one embodiment, and as described above, a profiler 140, as seen in FIG. 1, may be employed and determine that a portion of the JavaScript® (which may comprise a JavaScript® function) should be optimized. In one embodiment, the profiler 140 may comprise a portion of the application 220.

Upon receiving the at least a portion of the JavaScript® from the profiler 140, the system 255 may compile the at least a portion of the JavaScript® and may further execute the at least a portion of a JavaScript® across a plurality of browsing contexts. For example, the application 220 may issue a second request 215' to access a second website different from the web page described above in reference to the request 215, where the request 215 may comprise a first request 215. The second website may comprise one or more JavaScripts® where at least one of the one or more JavaScripts® are substantially similar to at least one JavaScript® received in the response 225. However, the second website may comprise a different browsing context than the browsing context associated with the response 225. Alternatively, or, in addition, the second browsing context may comprise at least a portion of the JavaScript®. The JavaScript® and the at least a portion of the JavaScript® may comprise at least a portion of a second response 225'.

In such a case where a second browsing context comprises the at least a portion of the JavaScript® that has been optimized to include dummy variables, the application 220 may access the at least portion of the JavaScript® from memory 250, being stored there upon being compiled with one or more placeholder values in place of one or more context specific reference values, which may also be referred to as context-specific references and/or browsing context references. The application 220 may also access a separate data file comprising assumptions related to the one or more context-specific references. It is contemplated that the data file may also comprise a portion of the at least a portion of the JavaScript® in one embodiment. The assumptions in a data file may be related to context specific reference values related to the first browsing context.

The system 255 may further comprise a means for executing the stored at least a portion of a JavaScript® across a plurality of browsing contexts. For example, upon accessing a second browsing context and the data file comprising the assumptions, the system 255 may access one or more second browsing context runtime variables related to the assumptions. The application 220 may then obtain one or more second browsing context-specific references from the second browsing context runtime variables. For example, in one embodiment a function included in the at least a portion of a JavaScript® may be chosen to be optimized by the profiler 140. In order to optimize the function, the application 220 may make assumptions about each context-specific reference value in the at least a portion of a JavaScript®. For example, the application 220 may create an assumption that a variable "V" in the function is positive, as such an assumption may enable more efficient and quicker operation of the JavaScript® in a particular browsing context. However, since variable V may be different amongst browsing contexts, but may rarely change within a particular browsing context the variable V should be obtained for each accessed browsing context comprising the at least a portion of a JavaScript®.

In one such embodiment, the optimizing compiler 210 or application 220 may generate the following optimized code that may be used across browsing contexts:

```
PerformUpdate(V)
if V = __
    [insert optimized code when coded assumption is satisfied]
else
    fall back to unoptimized code
```

As seen, this code contains no context specific references. For example, a dummy variable may be inserted into the script for the value of V. Since there are no context specific references, the script may be copied into and/or used across multiple contexts. In one embodiment, a context specific reference comprises information related to a browsing context. In addition to generating the above code, the compiler 210 or application 210 may generate a table which may encode the following information:
[V is positive]

The first time the JavaScript® received in the response 225 is executed, the PerformUpdate function shown above is called. PerformUpdate uses a runtime value comprising variable (V) and the table of encoded assumptions to determine an appropriate context specific reference value for this copy of the code. In one embodiment, upon accessing the data file to determine which runtime value to obtain, the application may obtain a runtime variable. In one embodiment, runtime variable V may comprise a value of 56 when PerformUpdate is called. The number 56 is positive, and in this example the assumption encoded in the accessed data file is satisfied. In such a case, 56 may also satisfy the requirements for the context specific reference value and therefore PerformUpdate replaces the dummy variable with the value 56. The modified code may then look like this:

```
if V = 56
    [insert optimized code when coded assumption is satisfied]
else
    [fall back to unoptimized code]
```

As seen, the call to run the PerformUpdate function may also be deleted from the generated code after the assumption is satisfied as the PerformUpdate function may only need to be called once for each variable. It is contemplated that this type of code may be generated and modified for each context-specific reference. The call to the PerformUpdate function may be deleted upon updating the variable in order to minimize any overhead that might be introduced from repeated runtime calls. For example, processing overhead may be reduced by decreasing the number of times runtime data is accessed. In one embodiment, if PerformUpdate is called and a negative runtime value is obtained, PerformUpdate may fail, nothing may be inserted for V, and the else portion the function shown above would be performed—causing the script to fall back to unoptimized code in the above example.

Many data structures operate similar to this example. For instance, objects in a JavaScript® Engine may comprise a "map", which may describe the object's structure. Object maps may be specific to the browsing context. In one such embodiment, one "V" in a desired optimized JavaScript® may be obtained by loading a property out of an object. The JavaScript® may be optimized by loading from a specific object offset, rather than looking up the correct offset in the map every time. Loading from a specific object offset, rather than looking up the correct offset in the map every time decreases the resource usage of the device 100 (i.e., is "expensive"). Such an optimization may occur when a JavaScript® is run across browsing contexts comprising objects having substantially similar structures and therefore may comprise substantially similar object maps. With such an example, the optimized code may have the following form:

```
PerformUpdate(obj)
if map(obj) = ____
    load obj.prop at offset 12
else
    fall back to unoptimized code
```

This is in contrast to unoptimized code, which may show map(obj)=M (where M is a known map structure). So, the optimizing compiler described in this invention would generate slightly different code, leaving out the "M" value and including the "PerformUpdate(obj)" call. In order for the optimized code to be used across browsing contexts, a reference to a context-specific map may not be made in the assumption table. Instead, in the table, the desired variable is encoded:
[obj has prop at offset 12]
Therefore, when PerformUpdate is called with a browsing context object comprising the runtime value, it checks the object's map to determine if the assumption is satisfied (e.g. the specified property is at offset 12). If the assumption is satisfied, a reference to the map is inserted into the code. Here, the "if" the reference comprises "M", described above, the code would be modified to:

```
if map(obj) = M'
    load obj.prop at offset 12
else
    fall back to unoptimized code
```

As seen, the PerformUpdate(obj) call is also again removed.

As seen above, the system 255 comprises a means for replacing one or more dummy variables in a stored optimized JavaScript® with the one or more second browsing context-specific references obtained from runtime variables, and a means for executing the optimized JavaScript® with the second browsing context-specific references. Likewise, the system 255 comprises means for storing the assumptions related to the context-specific reference values, with the assumptions comprising one or more requirements in one embodiment. Additionally, the means for executing the JavaScript® across a plurality of browsing contexts comprises, means for associating one or more second browsing context runtime values with the one or more assumptions and determining whether the one or more second browsing context runtime values fail to meet the one or more requirements. The system 255 also comprises a means for executing an unoptimized version of the at least a portion of a JavaScript®. In one embodiment, the one or more second browsing context runtime values/variables may comprise a description of a structure of an object.

Figure 3:
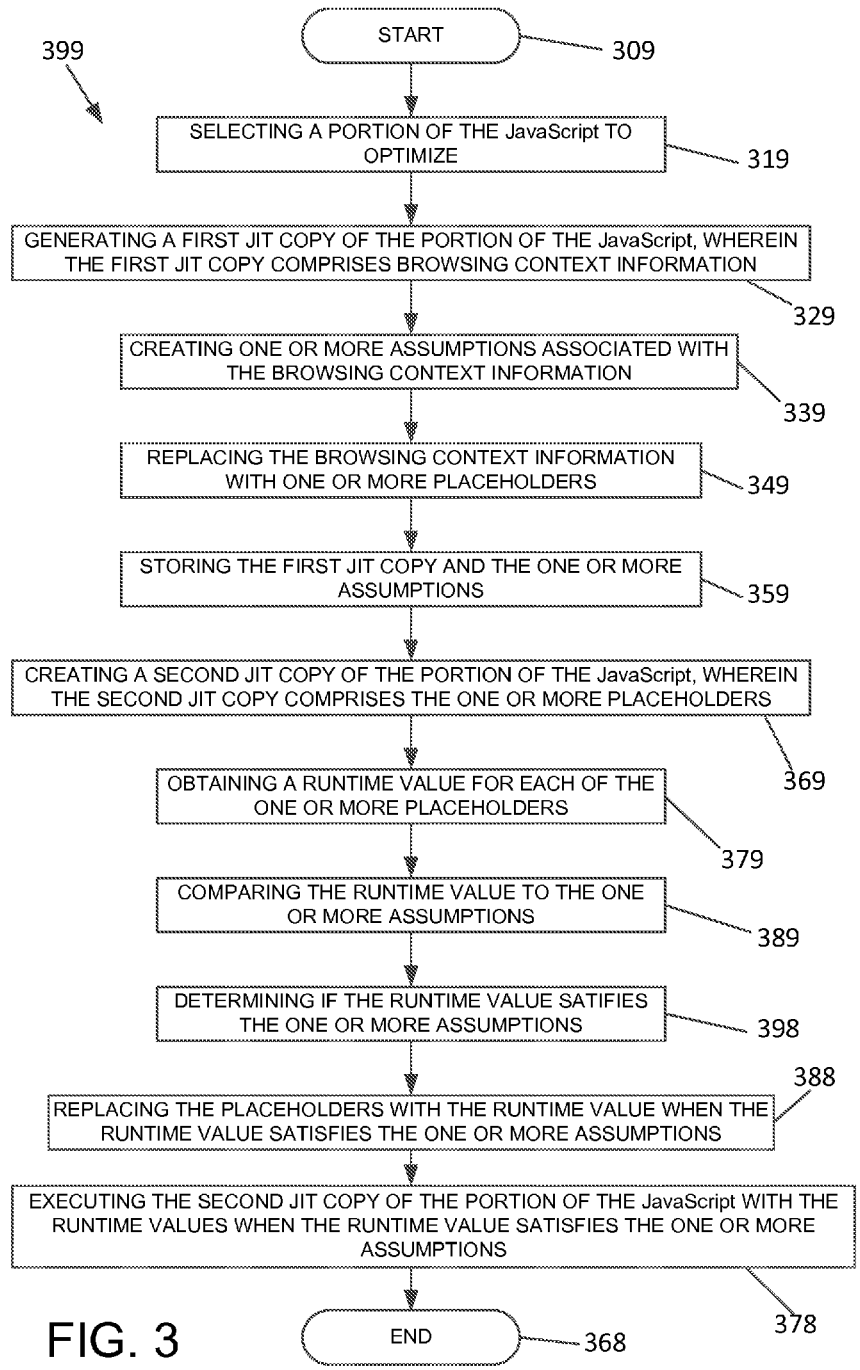
FIG. 3 illustrates a flowchart that depicts a method that may be carried out in connection with the embodiments described herein.

Turning now to FIG. 3, seen is a method 399 of executing a JavaScript®. One method 399 starts at 309 and at 319 comprises selecting a portion of the JavaScript® to optimize. For example, the profiler 140 seen in FIG. 1 may be used. At 329 the method comprises generating a first JIT copy of the portion of the JavaScript®, wherein the first JIT copy comprises browsing context information. Browsing context information may comprise context-specific reference values or other information in the browsing context. During this step, and as discussed elsewhere, the compiler 110 may generate the first JIT copy in a first browsing context. At 339 is the method step of creating one or more assumptions associated with the browsing context information, and at 349 is the method step of replacing the browsing context information with one or more placeholders. For example, the browsing context information may be replaced with one or more placeholders based on the assumptions. The assumptions may be actually created by the application 120 or profiler 140 or compiler 110. Upon replacing the browsing context information with one or more placeholders, at 359 the method comprises storing the first JIT copy and the one or more assumptions. The first JIT copy and the one or more assumptions may be stored in the memory 150.

In one embodiment, the application 120 may determine the time period for storing the first JIT copy in memory 150. It is contemplated that one or more first JIT copies may be stored in the memory 150 for each JavaScript®. The application may determine the time period for storing the various different first JIT copies comprising placeholders for the different JavaScript® code depending on a policy of caching, memory usage limits, and garbage collection. In one embodiment, the application may adjust the time duration that all or a portion of the different first JITed copies with placeholders live in the lifecycle of the application.

At 369 the method 309 comprises generating a second JIT copy of the portion of the JavaScript®, where the second JIT copy comprises the one or more placeholders. At 379 the method 399 comprises obtaining a runtime value for each of the one or more placeholders and at 389 the method 399 comprises comparing the runtime value to the one or more assumptions. The runtime values may be obtained from a second accessed browsing context. At 398, the method comprises determining if the runtime value satisfies the one or more assumptions. While finally at 388 the method 399 comprises replacing the placeholders with the runtime value when the runtime value satisfies the one or more assumptions. At 378 the method 399 comprises executing the second JIT copy of the portion of the JavaScript® with the runtime values when the runtime value satisfies the one or more assumptions.

The method 399 step 378 of executing the second JIT copy of the portion of the JavaScript® with the runtime values in one embodiment comprises executing the second JIT copy of the portion of the JavaScript® a first time with the runtime values. The step 378 may further comprise executing the second JIT copy of the portion of the JavaScript® at least one additional time with the runtime values. Furthermore, the second JIT copy may comprise runtime values from one or more additional browsing contexts. Additionally, the method 399 may further comprise executing the first JIT copy of the portion of the JavaScript® when one or more runtime values do not satisfy the one or more assumptions. In such a case, the [fall back to unoptimized code] option in the above examples may be implemented.

One embodiment may further comprise a non-transitory, tangible computer readable storage medium, encoded with processor readable instructions to perform a method of processing at least a portion of a JavaScript® comprising one or more first context specific references. For example, referring to FIG. 1, non-transitory, tangible computer readable storage medium, may comprise a memory 150 and the processor readable instructions may work with a processor 160. One method of processing at least a portion of a JavaScript® may comprise creating a data file such as, but not limited to, the data file described above having at least one attribute related to each of the one or more first context specific references in the JavaScript® and where the at least one attribute comprises at least one requirement. For example, upon receiving 115 the at least a portion of a JavaScript®, one or more first context specific references in the JavaScript® may be replaced with a placeholder value, with an attribute related to the one or more first context specific references being saved to a data file. As discussed above, an attribute in one example may comprise an object map.

The method of processing at least a portion of a JavaScript® may further comprise storing the data file and replacing each of the one or more first context specific references in the at least a portion of a JavaScript® with a dummy variable. Furthermore, the JavaScript® comprising the dummy variables may be compiled to create a compiled JavaScript®, the compiled JavaScript® may also be stored, and the compiled JavaScript® may be executed across browsing contexts. For example, when the application 120 accesses a website comprising first browsing context (which may also be referred to as a first browser context), with the first browsing context comprising the JavaScript®, the JavaScript® may executed by accessing the saved data file, obtaining a runtime value associated with each attribute corresponding to the context specific references, comparing each runtime value to the at least one attribute and determining if each runtime value satisfies the at least one requirement listed with the attribute. It is contemplated that the attribute may comprise the requirement in at least one embodiment.

Upon the application accessing a second browsing context, the application 120 may be adapted to obtain one or more second context specific references for each runtime value that satisfies the at least one requirement, replacing each dummy variable in the JavaScript® with the one or more second context specific references, and executing the compiled JavaScript® with the one or more second context specific references. The one or more first context specific references are obtained from a first browsing context; and obtaining one or more second context specific references for each runtime value that satisfies the at least one requirement comprises, accessing an object in a second browsing context, and obtaining a portion of the object that satisfies the at least one requirement.

The first browsing context comprises a first web site and the second browsing context comprises a second web site, the second web site comprising one or more different objects than the first web site. Obtaining one or more second context specific references for each runtime value that satisfies the at least one requirement comprises deriving the one or more second context specific references from at least a portion of at least one browsing context object.

Figure 4:
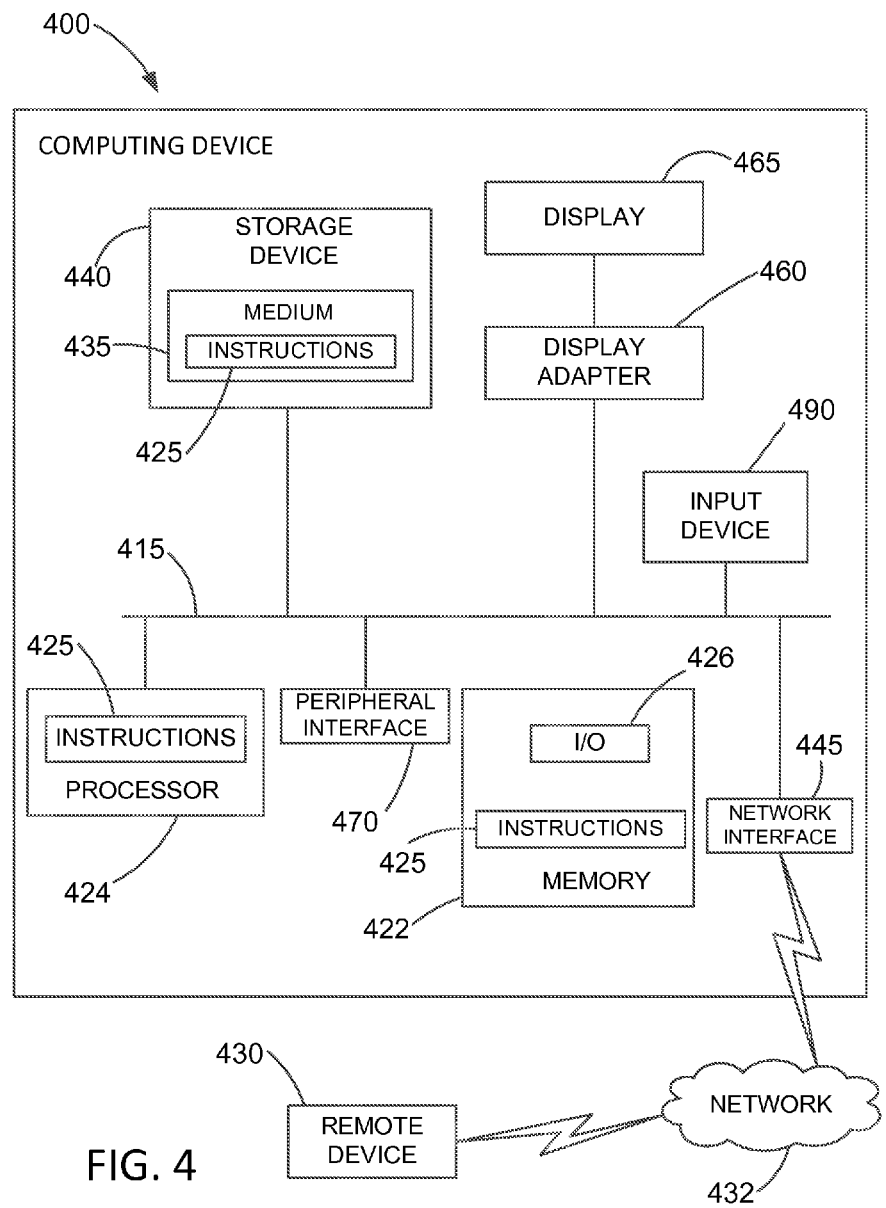
FIG. 4 illustrates a block diagram depicting components of a computing device.

Turning now to FIG. 4, shown is a diagrammatic representation of one embodiment of a machine in the exemplary form of the computing device 400 within which a set of instructions for causing a device to perform any one or more of the aspects and/or methodologies of the present disclosure to be executed.

Computing device 400 includes the processor 424, which communicates with the memory 422 and with other components, via the bus 415. Bus 415 may include any of several types of bus structures including, but not limited to, a memory bus, a memory controller, a peripheral bus, a local bus, and any combinations thereof, using any of a variety of bus architectures.

Memory 422 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 426 (BIOS), including basic routines that help to transfer information between elements within computing device 400, such as during start-up, may be stored in memory 422. Memory 422 may also include (e.g., stored on one or more machine-readable media) instructions (e.g., software) 425 which may comprise the application 120 seen in FIG. 1, the instructions 425 embodying any one or more of the aspects and/or methodologies of the present disclosure. In another example, memory 422 may further include any number of program modules including, but not limited to, an operating system, one or more application programs, other program modules, program data, and any combinations thereof.

Computing device 400 may also include a storage device 440. Examples of a storage device (e.g., storage device 440) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 440 may be connected to bus 415 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 440 may be removably interfaced with computing device 400 (e.g., via an external port connector (not shown)). Particularly, storage device 440 and an associated machine-readable medium 435 may provide nonvolatile and/or volatile storage of machine-readable instructions, data structures, program modules, and/or other data for computing device 400. In one example, instructions 425 may reside, completely or partially, within machine-readable medium 435. In another example, instructions 425 may reside, completely or partially, within processor 424.

Computing device 400 may also include an input device 490. In one example, a user of computing device 400 may enter commands and/or other information into computing device 600 via input device 490. Examples of an input device 490 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 490 may be interfaced to bus 415 via any of a variety of interfaces (not shown) including, but not limited to, a serial interface, a parallel interface, a game port, a USB interface, a FIREWIRE interface, a direct interface to bus 415, and any combinations thereof.

A user may also input commands and/or other information to computing device 400 via storage device 440 (e.g., a removable disk drive, a flash drive, etc.) and/or a network interface device 445 which may comprise the transmitter/receiver 410. In one embodiment, the transmitter/receiver 410 comprises a wireless transmitter/receiver. A network interface device, such as network interface device 445 may be utilized for connecting computing device 400 to one or more of a variety of networks, such as network 430, and one or more remote devices 430 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 432, may employ a wired and/or a wireless mode of communication. In general, any network topology may be used. Information (e.g., data, software 625, etc.) may be communicated to and/or from computing device 400 via network interface device 445.

Computing device 400 may further include a video display adapter 460 for communicating a displayable image to a display device, such as display device 465. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computing device 400 may include one or more other peripheral output devices including, but not limited to, an audio speaker, a printer, and any combinations thereof. Such peripheral output devices may be connected to bus 415 via a peripheral interface 470. Examples of a peripheral interface include, but are not limited to, a serial port, a USB connection, a FIREWIRE connection, a parallel connection, and any combinations thereof. In one example an audio device may provide audio related to data of computing device 400 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 465. Accordingly, a digitizer may be integrated with display device 465, or may exist as a separate device overlaying or otherwise appended to display device 465.

For example, the medium 435 may comprise a non-transitory, tangible computer readable storage medium, encoded with processor readable instructions to perform a method of optimizing HTTP requests. One such method may comprise determining a file size for an object being sought by each HTTP request, determining a file type for the object being sought by each HTTP request, sending a HTTP request for at least one first file type object, and sending a HTTP request for at least one second file type object after sending the HTTTP request for the at least one first file type object.

It is further contemplated that the medium 435, encoded with processor readable instructions to perform a method of optimizing HTTP requests may comprise determining a file size for the object being sought by each HTTP request and determining a file type for the object being sought by each HTTP request. Furthermore, a HTTP request may be sent for at least one first file type object a HTTP request may be sent for at least one second file type object after sending the HTTTP request for the at least one first file type object.

The medium 435 may further comprise receiving the at least one first type object before receiving the at least one second file type object. Furthermore, sending a HTTP request for at least one first file type object may comprise sending a plurality of HTTP requests for at least one first file type object. The plurality of HTTP requests may comprise a first HTTP request for a first file type object having a first file size and at least one second HTTP request for a second file type object having a second file size being sent after the first HTTP request, wherein the second file size is greater than the first file size. Additionally, the at least one first file type object may comprise a JavaScript® and a cascading style sheet and the at least one second file type object may comprise an image.

In conclusion, embodiments of the present invention provide for the optimized processing of JavaScript®. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computing device comprising a processor and a memory, together implementing:
   a Just-In Time (JIT) compiler adapted to,
      receive at least one identified portion of a scripting language source code, the at least one identified portion of the scripting language source code comprising original context specific reference values,
         wherein context specific reference values comprise references to at least a portion of an object in a browsing context of the scripting language source code,
      replace each of the original context specific reference values with one or more placeholders, and
      generate a first JIT copy of the at least one identified portion of the scripting language source code, wherein the first JIT copy of the at least one identified portion of the scripting language source code comprises the one or more placeholders;
   an application adapted to,
      store the first JIT copy of the at least one identified portion of the scripting language source code,
      create a description of the original context specific reference values, wherein the description has one or more requirements,
      store the description of the original context specific reference values,
      access runtime information related to the original context specific reference values,
      compare the runtime information to the stored description of the original context specific reference values,
      obtain new context-specific reference values by using the runtime information when the runtime information satisfies the one more requirements,
      replace the one or more placeholders in the first JIT copy of the at least one identified portion with the new context-specific reference values, and
      use the JIT compiler to generate a second JIT copy of the at least one identified portion of the scripting language source code, wherein the second JIT copy of the at least one identified portion of the scripting language source code comprises the new context-specific reference values; and
   a scripting language Engine adapted to execute the second JIT copy of the at least one identified portion of the scripting language source code.

2. The computing device of claim 1 wherein, the
   at least one identified portion of the scripting language source code is received from a runtime profiler; and
   new context-specific reference values are obtained when the application is running in the new context.

3. The computing device of claim 1 wherein, at least a portion of the description of the original context specific reference values comprises a value.

4. The computing device of claim 3 wherein, the runtime information comprises a value.

5. The computing device of claim 1 wherein, the browsing context comprises one or more objects adapted for use in a user interface media display.

6. The computing device of claim 5 wherein, at least one of the one or more objects comprises a document object model tree.

7. The computing device of claim 1 wherein the second JIT copy of the at least one identified portion of the scripting language source code is adapted to be executed across a plurality of browsing contexts 8. A computing system comprising,
   means for replacing one or more context-specific references in at least a portion of a scripting language code with one or more dummy variables, wherein the one or more context-specific references comprise references to at least a portion of an object in a browsing context;
   means for compiling the at least a portion of a scripting language code; and
   means for executing the at least a portion of a scripting language code across a plurality of browsing contexts.

9. The computing system of claim 8 further comprising,
   means for storing the at least a portion of a scripting language code;
   means for storing assumptions related to the one or more context-specific references, wherein, the one or more context-specific references comprise one or more first browsing context-specific references; and
   means for executing the at least a portion of a scripting language code across a plurality of browsing contexts comprises,
      means for accessing one or more second browsing context runtime variables,
      means for obtaining one or more second browsing context-specific references from the second browsing context runtime variables,
      means for replacing the one or more dummy variables with the one or more second browsing context-specific references, and
      means for executing the at least a portion of the scripting language code with the second browsing context-specific references.

10. The computing system of claim 8 further comprising,
   means for storing one or more assumptions related to each of the one or more context-specific references; and wherein,
   the one or more assumptions comprise one or more requirements;
   the means for executing the at least a portion of a scripting language code across a plurality of browsing contexts comprises,
      means for accessing one or more second browsing context runtime variables;
      means for associating the one or more second browsing context runtime variables with the one or more assumptions;

means for determining the one or more second browsing context runtime variables fail to meet the one or more requirements; and means for executing an unoptimized version of the at least a portion of a scripting language code.

11. The computing system of claim 10 wherein, the one or more second browsing context runtime variables comprises a description of a structure of an object.

12. A method of executing a scripting language code comprising, selecting a portion of the scripting language code to optimize;

generating a first JIT copy of the portion of the scripting language code, wherein the first JIT copy comprises browsing context information, wherein browsing context information comprises references to at least a portion of an object in the browsing context;

creating one or more assumptions associated with the browsing context information;

replacing the browsing context information with one or more placeholders;

storing the first JIT copy and the one or more assumptions;

creating a second JIT copy of the portion of the scripting language code, wherein the second JIT copy comprises the one or more placeholders;

obtaining a runtime value for each of the one or more placeholders;

comparing the runtime value to the one or more assumptions;

determining if the runtime value satisfies the one or more assumptions;

replacing the placeholders with the runtime value when the runtime value satisfies the one or more assumptions; and executing the second JIT copy of the portion of the scripting language code with the runtime values when the runtime value satisfies the one or more assumptions.

13. The method of claim 12, wherein, executing the second JIT copy of the portion of the scripting language code with the runtime values comprises executing the second JIT copy of the portion of the scripting language code a first time with the runtime values; and further comprising executing the second JIT copy of the portion of the scripting language code at least one additional time with the runtime values.

14. The method of claim 12 further comprising, executing the first JIT copy of the portion of the scripting language code when the runtime value does not satisfy the one or more assumptions.

15. The method of claim 12, wherein, the placeholder comprises a dummy variable.

16. The method of claim 12 wherein, the first JIT copy of the portion of the scripting language code comprises a first JIT copy for a first browsing context; and the second JIT copy of the portion of the scripting language code comprises a second JIT copy for a second browsing context.

17. The method of claim 12, wherein, storing the first JIT copy and the one or more assumptions comprises, employing an application to use one or more of a cache policy, a memory usage policy, and a garbage collection policy in determining a period of time for storing the first JIT copy and the one or more assumptions; and adjusting the period of time for, storing at least a portion of the first JIT copy and the one or more assumptions, and keeping the first JIT copy and the one or more assumptions live in an application lifecycle.

18. The method of claim 17, wherein, the scripting language code comprises a plurality of sections of scripting language code; and the first JIT copy comprises a plurality of first JIT copies.

19. A non-transitory, tangible computer readable storage medium, encoded with processor readable instructions to perform a method of processing at least a portion of a scripting language code comprising one or more first context specific references, wherein context specific references comprise references to at least a portion of an object in a browsing context of the scripting language code, the method comprising, creating a data file having at least one attribute related to each of the one or more first context specific references, wherein the at least one attribute comprises at least one requirement;

storing the data file;

replacing each of the one or more first context specific references in the at least a portion of a scripting language code with a dummy variable;

compiling the at least a portion of the scripting language code with the dummy variables to create a compiled scripting language code;

storing the compiled scripting language code; and executing the compiled scripting language code in a first browser context by, accessing the data file, obtaining a runtime value associated with each of the at least one attribute, comparing each runtime value to the at least one attribute, determining if each runtime value satisfies the at least one requirement, obtaining one or more second context specific references for each runtime value that satisfies the at least one requirement, replacing each dummy variable in the scripting language code with the one or more second context specific references, and executing the compiled scripting language code with the one or more second context specific references.

20. The non-transitory, tangible computer readable storage medium of claim 19 wherein, the one or more first context specific references are obtained from a first browsing context; and obtaining one or more second context specific references for each runtime value that satisfies the at least one requirement comprises, accessing an object in a second browsing context, and obtaining a portion of the object that satisfies the at least one requirement.

21. The non-transitory, tangible computer readable storage medium of claim 20 wherein, the first browsing context comprises a first web site; and the second browsing context comprises a second web site, the second web site comprising one or more different objects than the first web site.

22. The non-transitory, tangible computer readable storage medium of claim 19 wherein, obtaining one or more second context specific references for each runtime value that satisfies the at least one requirement comprises deriving the one or more second context specific references from at least a portion of at least one browsing context object.

* * * * *